US009574628B2

(12) United States Patent
Bernard et al.

(10) Patent No.: US 9,574,628 B2
(45) Date of Patent: Feb. 21, 2017

(54) RADIAL SPRING FOR A DISK BRAKE PAD AND BRAKE PADS AND BRAKES PROVIDED WITH SUCH RADIAL SPRINGS

(71) Applicant: Robert Bosch GmbH, Stuttgart (DE)

(72) Inventors: Simon Bernard, Le Perreux s/Marne (FR); Sandra Merrien, Paris (DE); Roger Mahoudeaux, Le Blanc Mesnil (FR)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/364,137

(22) PCT Filed: Dec. 14, 2012

(86) PCT No.: PCT/EP2012/075581
§ 371 (c)(1),
(2) Date: Jun. 10, 2014

(87) PCT Pub. No.: WO2013/087856
PCT Pub. Date: Jun. 20, 2013

(65) Prior Publication Data
US 2015/0176666 A1    Jun. 25, 2015

(30) Foreign Application Priority Data

Dec. 15, 2011  (FR) ..................................... 11 03874

(51) Int. Cl.
*F16D 65/097*   (2006.01)
*F16D 55/226*   (2006.01)

(52) U.S. Cl.
CPC ....... *F16D 65/0972* (2013.01); *F16D 55/2262* (2013.01)

(58) Field of Classification Search
CPC ......................... F16D 65/0972; F16D 55/2262
USPC ................................. 188/73.31, 73.37, 73.38
See application file for complete search history.

(56) References Cited

U.S. PATENT DOCUMENTS

| 4,444,296 | A  | * | 4/1984  | Marianu ....................... 188/72.2 |
| 5,941,348 | A  | * | 8/1999  | Matsumoto ......... F16D 65/0972 188/73.36 |
| 6,003,642 | A  | * | 12/1999 | Mori et al. ................. 188/73.44 |
| 6,186,288 | B1 | * | 2/2001  | Baba et al. ................ 188/73.36 |
| 6,286,636 | B1 | * | 9/2001  | Iwata ......................... 188/73.31 |
| 6,296,085 | B1 | * | 10/2001 | Yukoku ...................... 188/73.36 |

(Continued)

FOREIGN PATENT DOCUMENTS

CN    1384904 A    12/2002
CN    1854554 A    11/2006

(Continued)

*Primary Examiner* — Thomas J Williams
*Assistant Examiner* — Mariano Sy
(74) *Attorney, Agent, or Firm* — Norton Rose Fulbright US LLP; Gerard Messina

(57) ABSTRACT

A radial spring for a disk brake pad and brake pads and brakes provided with such radial springs, in which the radial spring is for the lug of a brake pad. The spring includes a clamp and a supporting loop. The clamp is formed of a straight arm, an undulating bottom, and an arm in the shape of a Z, followed by the loop connected by a bend, followed by a bend with a large radius of curvature connected to the pad terminated by a turn that is almost at a right angle to the extremity of the pad.

10 Claims, 2 Drawing Sheets

(56) References Cited

U.S. PATENT DOCUMENTS

| | | | |
|---|---|---|---|
| 6,533,080 B2* | 3/2003 | Miyata | 188/73.37 |
| 7,152,717 B2* | 12/2006 | Lelievre et al. | 188/73.38 |
| 8,205,726 B2* | 6/2012 | Schorn et al. | 188/73.37 |
| 8,276,717 B1* | 10/2012 | Sherman, II | 188/73.38 |
| 2007/0240946 A1 | 10/2007 | Schorn et al. | |
| 2008/0135353 A1 | 6/2008 | Takeo et al. | |
| 2009/0159376 A1* | 6/2009 | Rossignol et al. | 188/73.38 |
| 2012/0024641 A1* | 2/2012 | Ito | F16D 65/0972 188/72.1 |
| 2012/0222925 A1* | 9/2012 | Kaneko | F16D 65/0977 188/73.38 |

FOREIGN PATENT DOCUMENTS

| | | |
|---|---|---|
| EP | 2 072 850 | 6/2009 |
| WO | 2011/062160 | 5/2011 |

\* cited by examiner

RADIAL SPRING FOR A DISK BRAKE PAD AND BRAKE PADS AND BRAKES PROVIDED WITH SUCH RADIAL SPRINGS

FIELD OF THE INVENTION

The present invention concerns a radial spring for a brake pad intended to slide transversely over the lug of a disk brake pad, the spring, formed of a ribbon of spring steel, having arms for attachment on the lug and a support portion for sliding against the lower housing surface of the arm of the yoke. The present invention also concerns brake pads and disk brakes provided with such radial springs.

BACKGROUND INFORMATION

Radial springs are discussed in European Patent EP 2072850, but the springs in that document are believed to be relatively bulky and their sliding movement in the yoke housing is not always uniform in the two directions of movement of the pad during braking and its return after braking.

SUMMARY OF THE INVENTION

An object of the present invention is the improvement of the lug guide springs on a brake pad to facilitate their mounting on the lugs and the installation of the pad in the yoke, as well as the improvement of the flexibility of the guide mechanism and its regularity, in particular, obtention of the heightened sensitivity required to return the brake pad to its non-contact position with the disk without requiring significant travel, which would be detrimental for the brake's response time.

To that end, the invention concerns a guide spring of the type described above, characterized in that it comprises
   a portion in the shape of a clamp to straddle the lug of the pad, extended by a supporting loop, forming a pad that slides in the yoke housing,
   wherein the clamp has
       a fixed, straight arm having a flared extremity that can press against a face of the lug, followed by
       a segment forming the bottom of the clamp, and
       a movable arm connected to the bottom by an elastic hinge and closing the opening of the clamp
   the supporting loop forming the pad terminating in a turn and connected by a double bend on the movable arm to elastically circumvent the bottom and come before the right arm via the turn,
   the pad forming a lever that, elastically brought against the bottom, enlarges the opening of the clamp.

This shape of radial spring, both in terms of the clamp and the loop, considerably simplifies installation of the clamp on the lug of the pad and, subsequently, the introduction of the lug equipped with this radial spring into the arm housing of the yoke. Once the radial spring is installed, its shape provides good support at the top of the lug against the outside radial surface of the arm housing, while participating in keeping the lug and, consequently, the pad, parallel to itself during its movement of translation during braking and return at the end of braking.

The large guide surface constituted by the pad reduces friction and promotes ease of slippage during braking and return movements.

According to another advantageous characteristic, the bottom of the clamp has an undulating shape composed of a first bend, concave with respect to the interior of the clamp, followed by a convex undulation forming a peak, followed by a bend forming the articulation with the movable arm, the peak constituting the support surface for the clamp against the bottom of the lug.

According to another advantageous characteristic, the movable arm has a Z shape encompassing the bend connecting the arm to the bottom and the bend connecting the other extremity of the movable arm to a straight segment that is itself connected to the other bend of the loop.

This Z shape of the movable arm promotes engagement of the clamp on the lug and also the stability of maintaining the clamp on the lug during translational movements of the pad with respect to the arm.

According to another characteristic, the second bend of the supporting loop forms the guide nose at the forward part of the radial spring installed on the lug of the pad for introducing the lug, thus equipped, into the arm housing.

The second bend forms a highly curved portion, preventing the lug from catching when it is introduced into the arm housing.

According to another advantageous characteristic, the pad of the supporting loop has a curved shape with a large radius of curvature.

According to another advantageous characteristic, the first bend has a radius of curvature appreciably double the radius of the bend connecting the bottom to the right arm of the clamp and the radius of the clamp connecting the movable arm to the bottom, and the second bend has a radius that is appreciably double the radius of the first bend of the loop.

Finally, and as indicated, the invention concerns brake pads equipped with such radial springs on each of their lugs and a disk brake whose brake pads are provided with such radial springs.

The present invention will be described using an example of an embodiment of a brake pad guide spring shown in the attached drawings.

DETAILED DESCRIPTION

Figure 1:
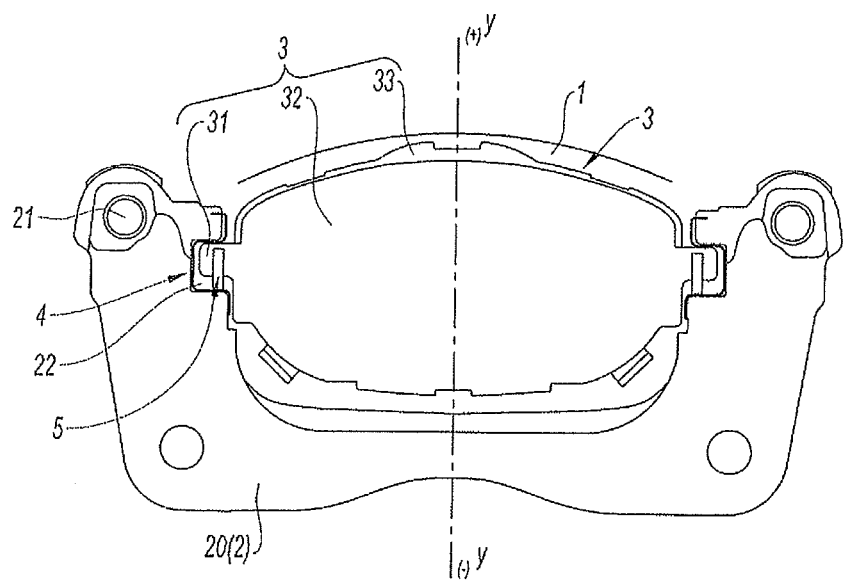
FIG. 1 shows a front view of a disk brake yoke showing a portion of the brake pad with its lug engaged in the housing of an arm of the yoke through the intermediary of a radial spring.

According to FIG. 1, the present invention concerns a disk brake in which the portion to which the invention applies is represented schematically.

The disk brake cooperates with a disk, 1, and is composed of a caliper, not shown, having a yoke, 2, which is itself formed of two parallel arms, 20, each of which has a very flattened U shape, connected by posts, 21. Each arm extremity, 20, has a guide housing, 22, axially directed and equipped with a guide organ, 4; each housing accommodates a lug, 31, of pad 3, equipped with a radial spring, 5.

Brake pads 3 consist of a metal lining support, 30, equipped with two lugs 31 serving for its attachment to arms 20 of yoke 2, and this lining support 30 carries brake lining 32, intended to be applied to a face of disk 1. The two pads, 3, are actuated in the axial direction perpendicular to the plane of FIG. 1 to squeeze the disk and impart braking. During this braking movement and the return movement in disengaged position, brake pads 3 move into housing 22 of arms 20 of the yoke by being pressed against the top of housing 22 and guided by radial spring 5. Radial spring 5 is, overall, in a plane perpendicular to the plane of FIG. 1.

In FIG. 1, the brake disk is parallel to the plane of the figure and the axis of brake disk 1 is perpendicular to the plane of the figure.

Figure 2:
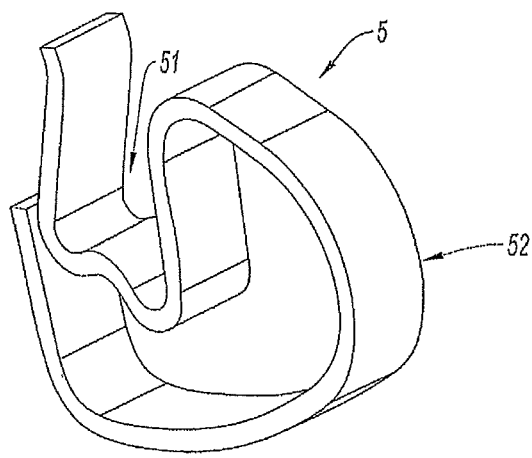
FIG. 2 shows an isometric view of the radial spring in its relaxed position according to the invention.

FIG. 2 is an isometric view of a radial spring 5 according to the invention for engagement in lug 31 of the brake pad of FIG. 1 to maintain lug 31 in housing 22 and enable it to slide as the brake is actuated.

Radial spring 5 consists of a spring steel ribbon that is bent according to various radii of curvature so as to constitute clamp 51, which slides transversely and from below on lug 31 of the pad. Clamp 51 is completed by loop 52 used as a support in yoke housing 22 to guide the lug. This loop 52 also facilitates the placement of spring 5 on lug 31, followed by the positioning of brake pad 3 in each of two housings 22 of yoke 2.

Figure 3:
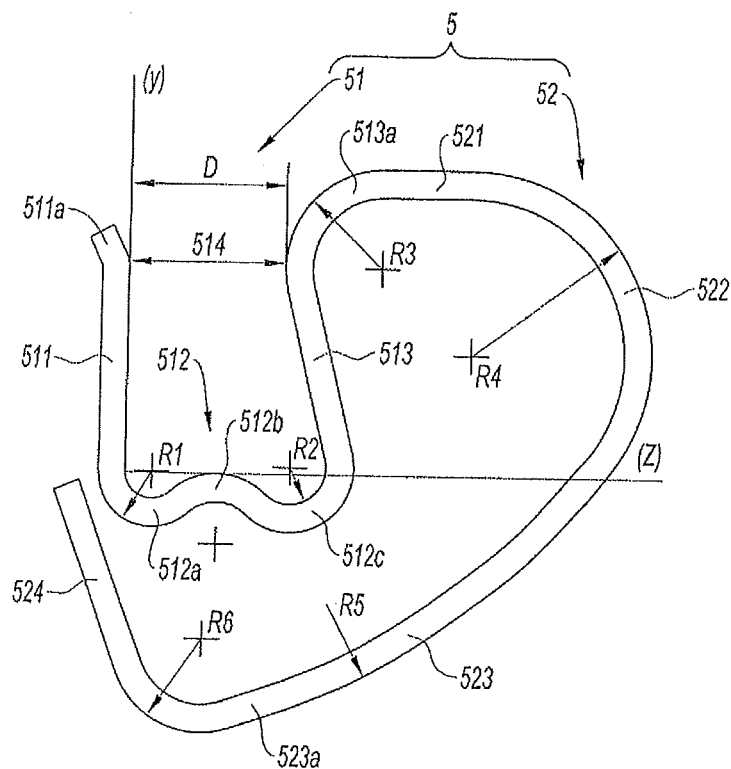
FIG. 3 shows a side view of a radial spring of a brake pad according to the invention.

To facilitate the description, FIG. 3 shows the marks of two perpendicular axes, somewhat defining an orthogonal coordinate system for horizontal axis (Z) and vertical axis (Y).

This orientation appreciably corresponds to the orientation of spring 5 when installed on the lug of a brake pad, by convention using for the orientation the radial direction, that is, a direction passing through the axis of the brake disk, which appreciably corresponds to direction (Y), and axial direction (Z), parallel to the brake disk and, therefore, perpendicular to the brake pad (FIG. 1). The pad is parallel to the surface of the disk, and the lug at each extremity is in the direction perpendicular to plane YZ.

According to the orientation of FIG. 1, the exterior side of the brake disk is situated on the high side (+Y) and the center of the brake disk is situated on the bottom of the interior side in the (−Y) direction of axis (Y).

According to FIG. 3, radial spring 5, realized from a bent spring steel ribbon, consists of a first part constituting clamp 51, intended to be engaged with the lug of the brake pad and continuing along supporting loop 52, forming a pad and an actuating lever.

Clamp 51 is formed by arm 511, which, by convention, is called the stationary arm. It is straight and parallel to axis OY, and terminates in flared extremity 511a.

Stationary arm 511 is connected by bend 512a to undulating segment 512, forming peak 512b, which constitutes the bottom of clamp 51. Undulating segment 512 continues at the other end in bend 512c, connected to movable arm 513, having an overall Z shape. This movable arm 513 is connected to bottom 512 by the hinge realized in the material by bend 512c. Because of its Z shape, arm 513 closes opening 514 of clamp 51, which has dimension D with respect to axis OY, defined by stationary arm 511.

The upper portion of movable arm 513 is connected by bend 513a to loop 52, composed of first straight arm 521, followed by wide bend 522, then segment 523 with a vary large radius of curvature, terminating in turn 524, which is nearly perpendicular at the extremity of segment 523; the connection being made by bend 523a.

This complex shape of loop 52 enables it to provide different important functions for mounting the pad and brake operation. In effect, since the radial spring is made of a spring steel ribbon, which has the same thickness throughout, the elasticity/stiffness of the articulations formed by the bends between the different segments depends on the radius of curvature, the elasticity being generally greater for a large radius of curvature than for a small radius of curvature.

Such an embodiment, which applies the ratios of different bend radii, at least proportionally, enables segment 523 to function as a pad guiding lug 31 as it slides against bottom 22a of housing 22; bottom 22a can be formed directly by the arm housing or by an intermediary part on which pad 523 slides.

Loop 52 also serves to raise lug 31 so it presses against upper side (or exterior radial side) 22b of the housing (FIG. 1, FIG. 4) and position it with respect to this reference surface through the interplay of the elasticity of wide bend 522 and narrower bend 513a. Loop 52 also constitutes an elastically articulated lever, slightly enlarging, at the end of its complete travel, opening 514 of clamp 551 and facilitating the positioning of clamp 51 on lug 31 without interfering with the clamping firmness of clamp 51 on the lug, thereby avoiding any operating play here.

This positioning is facilitated by flared extremity 511a of arm 511.

Figure 4:
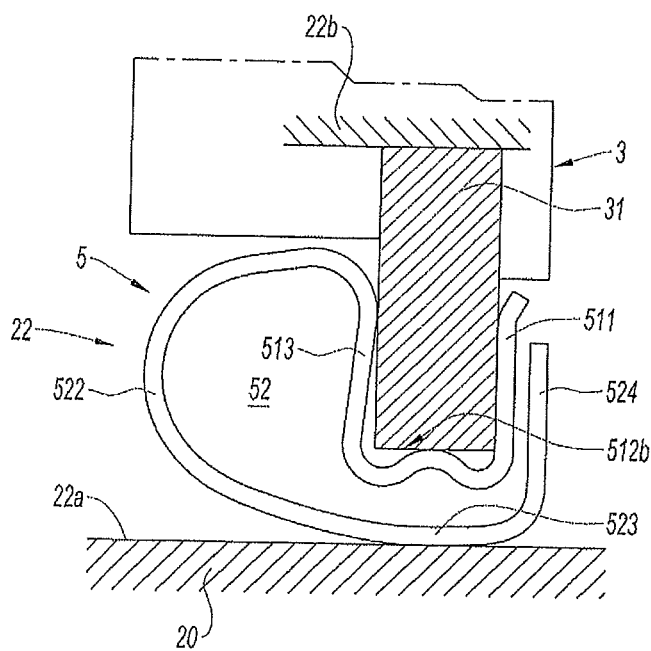
FIG. 4 shows a schematic front view illustrating the radial spring according to the invention engaged on the lug of a brake pad and pressing against the lower surface of the housing of the brake yoke.

FIG. 4 shows a cutaway of lug 31 equipped with radial spring 5 resting upon surface 22a of housing 22, the top of lug 31 being applied to upper surface 22b of the housing. It emphasizes the clasping of lug 31 by straight arm 511 and peak 512b of bottom undulation 512, Z-shaped bend 513a of arm 513 resting locally against the other face of lug 31.

FIG. 4 also shows the rounded shape of loop 52, whose bend 522 facilitates the introduction and guidance of lug 31 equipped with spring 5 when the pad is mounted between surfaces 22a, 22b of housing 22.

Overall, radial spring 5 according to the invention considerably improves assembly conditions.

As an example, the radius of curvature for the various bends is as follows:

| Bend | Radius | Approximately, in mm |
| --- | --- | --- |
| 512a | R1 | 1.5 |
| 512c | R2 | 1 |
| 513a | R3 | 2.5 |
| 522 | R4 | 4.5 |
| 523 | R5 | 20.0 |
| 523a | R6 | 2.5 |

Each of the two lugs of a brake pad receives radial spring 5 as described above, and since there are two brake pads per disk brake, the disk brake thus equipped has four radial springs.

The invention applies to the field of disk brakes for automotive vehicles.

THE REFERENCE KEY IS AS FOLLOWS

1 Brake disk
2 Yoke
20 Arm
21 Support
22 Arm housing
22a Bottom of housing
22b Top of housing
3 Brake pad
30 Lining support
31 Lug
32 Lining 4 Guide organ
5 Radial spring
51 Clamp
511 Stationary arm
511a Flared end
512 Undulated segment/bottom of clamp
512a Bend
512b Top of undulation
512c Bend
513 Z-shaped movable arm
513a Bend
52 Supporting loop
521 First straight arm
522 Bend
523 Pad forming lever
523a Bend
524 Turn

The invention claimed is:

1. A radial spring for use in a brake pad in which the radial spring is slid transversely over a lug of a disk brake pad, comprising:
a radial spring arrangement formed of a ribbon of spring steel, having arms for attachment on the lug and a support portion for sliding against a lower surface of a housing of the arm of a yoke;
wherein a portion of the radial spring is in the shape of a clamp to straddle the lug of the brake pad, extended by a supporting loop forming a pad that slides in the yoke housing,
wherein the clamp has a stationary, straight arm having a flared extremity that is pressable against a face of the lug, followed by a segment forming a bottom of the clamp, and a movable arm connected to the bottom by an elastic hinge and closing the opening of the clamp,
wherein the supporting loop forming the pad terminates in a turn and is connected by a double bend to the movable arm to elastically circumvent the bottom and come before the straight arm via the turn,
wherein the double bend exhibits a first bend having only a first radius of curvature and a second bend having only a second radius of curvature and into which the first bend directly transitions, wherein no intervening segment that includes a straight section is present between the first bend and the second bend, and wherein each of the first and second bends lacks a straight segment,
wherein the pad forms a lever that, elastically brought against the bottom, enlarges the opening of the clamp.

2. The radial spring of claim 1, wherein the bottom of the clamp is formed of an undulation composed of a first bend, concave with respect to the interior of the clamp, followed by a convex undulation forming a peak, followed by a bend forming the articulation with the movable arm, the peak constituting the support surface of the clamp against a bottom of the lug.

3. The radial spring of claim 1, wherein the second bend of the supporting loop forms the guide nose in the forward part of the radial spring installed on the lug of the pad to introduce the lug thus equipped into the housing of the arm.

4. The radial spring of claim 1, wherein the pad of the supporting loop has a curved shape with a large radius of curvature.

5. The radial spring of claim 1, wherein the first radius of curvature is appreciably double a radius of a bend connecting a bottom of the straight arm of the clamp and a radius of the bend connecting the movable arm to the bottom of the clamp, and the second radius of curvature is appreciably double the first radius of curvature of the first bend of the double bend.

6. The radial spring of claim 1, wherein the movable arm has a Z-shape encompassing a bend connecting the movable arm to the bottom and a bend connecting an extremity of the movable arm to a straight segment, itself connected to the loop, and wherein the Z-shape of the movable arm inclines the movable arm in a closing direction relative toward the straight arm.

7. A disk brake pad, comprising:
lugs, wherein a radial spring slid transversely over each of the lugs;
wherein each of the radial springs includes:
a radial spring arrangement formed of a ribbon of spring steel, having arms for attachment on the lug and a support portion for sliding against a lower surface of a housing of the arm of a yoke,
wherein a portion of the radial spring is in the shape of a clamp to straddle the lug of the brake pad, extended by a supporting loop forming a pad that slides in the yoke housing,
wherein the clamp has a stationary, straight arm having a flared extremity that is pressable against a face of the lug, followed by a segment forming a bottom of the clamp, and a movable arm connected to the bottom by an elastic hinge and closing the opening of the clamp,
wherein the supporting loop forming the pad terminates in a turn and is connected by a double bend to the movable arm to elastically circumvent the bottom and come before the straight arm via the turn,
wherein the double bend exhibits a first bend having only a first radius of curvature and a second bend having only a second radius of curvature and into which the first bend directly transitions, wherein no intervening segment that includes a straight section is present between the first bend and the second bend, and wherein each of the first and second bends lacks a straight segment,
wherein the pad forms a lever that, elastically brought against the bottom, enlarges the opening of the clamp.

8. The disk brake pad of claim 7, wherein the movable arm has a Z-shape encompassing a bend connecting the movable arm to the bottom and a bend connecting an extremity of the movable arm to a straight segment, itself connected to the loop, and wherein the Z-shape of the movable arm inclines the movable arm in a closing direction relative toward the straight arm.

9. A disk brake, comprising:
a first brake pad; and
a second brake pad;
wherein each of the brake pads is equipped with a radial spring;
wherein each of the radial springs includes:
a radial spring arrangement formed of a ribbon of spring steel, having arms for attachment on the lug and a support portion for sliding against a lower surface of a housing of the arm of a yoke,
wherein a portion of the radial spring is in the shape of a clamp to straddle the lug of the brake pad, extended by a supporting loop forming a pad that slides in the yoke housing,
wherein the clamp has a stationary, straight arm having a flared extremity that is pressable against a face of the lug, followed by a segment forming a bottom of the clamp, and a movable arm connected to the bottom by an elastic hinge and closing the opening of the clamp, wherein the supporting loop forming the pad terminates in a turn and is connected by a double bend to the movable arm to elastically circumvent the bottom and come before the straight arm via the turn, wherein the double bend exhibits a first bend having only a first radius of curvature and a second bend having only a second radius of curvature and into which the first bend directly transitions, wherein no intervening segment that includes a straight section is present between the first bend and the second bend, and wherein each of the first and second bends lacks a straight segment, wherein the pad forms a lever that, elastically brought against the bottom, enlarges the opening of the clamp.

10. The disk brake of claim 9, wherein the movable arm has a Z-shape encompassing a bend connecting the movable arm to the bottom and a bend connecting an extremity of the movable arm to a straight segment, itself connected to the loop, and wherein the Z-shape of the movable arm inclines the movable arm in a closing direction relative toward the straight arm.

* * * * *